United States Patent

[11] 3,601,143

[72] Inventor  Joseph T. Glennon
               127 Lincoln Ave., Elizabeth, N.J. 07208
[21] Appl. No. 793,424
[22] Filed     Jan. 23, 1969
[45] Patented  Aug. 24, 1971

[54] VALVE SERVICE BOXES
     7 Claims, 4 Drawing Figs.
[52] U.S. Cl. ................................................ 137/364
[51] Int. Cl. ............................................... F16l 5/00
[50] Field of Search ..................................... 285/302,
         189, 287; 287/54; 248/353; 24/137; 137/363–371

[56]                References Cited
              UNITED STATES PATENTS
    343,416   6/1886   Adee et al. ..................... 137/368
  1,908,821   5/1933   Cornell .......................... 285/287 X
  1,977,112  10/1934   Coe ............................... 285/287 X
  2,360,164  10/1944   Santora .......................... 24/138
  2,931,383   4/1960   Handley .......................... 137/369
  3,159,413  12/1964   Silverman ....................... 285/189
              FOREIGN PATENTS
    521,359   1/1956   Canada .......................... 137/363

Primary Examiner—Henry T. Klinksiek
Attorney—Popper, Bain, Bobis & Gilfillan

ABSTRACT: A valve service box comprises an erect telescopic pipe structure whose sections made of plastic having resilient quality, are in frictional engagement. The upper end of the upper section has a collar holding a closure plate. The lower section is provided with two aligned diametrically opposite keyhole-shaped notches, starting from its lower rim edge, so that upon downward movement of said pipe structure in a trench or excavation leading to a sunken valve interposed in a gas or water pipeline, the valve's inlet and outlet tubular members are entered in said notches respectively whereupon the lower pipe section is snapped on to the plumbing, thus anchoring said lower section against upward movement.

PATENTED AUG 24 1971　3,601,143

INVENTOR,
Joseph T. Glennon,
BY
ATTORNEY.

3,601,143

VALVE SERVICE BOXES

The present invention relates to service boxes which are also called valve or curb boxes. Essentially, these comprise an erect pipe downward from ground level, leading to and encircling a gas or water shutoff valve which is at a distance below ground level. The upper end of said pipe terminates in a collar or ferrule which has a closure plate. The top structure is usually flush with the ground. Upon removal of the closure member, access is had to the sunken valve, to be opened or closed by means of a socket wrench or other suitable tool having an elongated shank. More particularly, this invention concerns itself with valve service boxes of this general class, in which the erect pipe is composed of telescopic sections in order to be made adjustable to suit different valve-depth positions.

The telescopic sections are in frictional engagement, and need be set to give proper pipe structure length to suit the particular installation. Adjustments to decrease this length, before or after filling in the excavation, are easily made because the bottom end of the pipe structure is stopped against the excavation floor or the sunken plumbing, thus permitting the upper pipe section to be forced downwardly. But should it be required to increase the pipe length, there must be access to hold the lower pipe section so the upper pipe section can be withdrawn therefrom as need be. This is awkward to do during installation, and if the earth is loose around the telescopic tubular structure after installation and such length need be increased because of a grading of the land, it becomes no easy matter.

I have realized that to make such lengthening operation easy, and capable of being accomplished by a worker on the ground who shall manipulate only the upper telescopic section, would require that the lower telescopic section shall be anchored. I have tried to prevent upward movement of the lower pipe section by having a bolt inserted diametrically across near the lower end rim of said lower section, after the pipe structure was installed in the trench or excavation; said bolt being positioned below the valve through aligned holes in the pipe wall and secured by an external nut. This required an appreciably longer lower pipe section, and the bolt and nut had to be installed by a worker down in the excavation. The appreciable increase in cost in both material and labor, made a very serious objection.

It is therefore the principal object of this invention to provide a novel and improved valve service box construction of the class set forth, which affords quick and easy attachment of the lower pipe section to the underground plumbing, so it becomes a simple matter to lengthen the telescopic pipe structure by the handling and manipulation only of the upper pipe section by a worker on the ground.

Another object thereof is to provide novel and improved construction at the lower end of the lower pipe section so upon merely bringing said section downward, it will automatically attach itself to the sunken plumbing, and preferably, such attachment means shall be an integral part of the lower pipe itself.

A further object of this invention is to provide a novel and improved service box of the character described, which has the aforementioned attributes, which is reasonable in cost to manufacture, easy to install, use and manipulate, and efficient in carrying out the purposes for which it is designed.

Other objects and advantages will become apparent as this disclosure proceeds.

For the practice of this invention, a preferred embodiment has its lower telescopic pipe section provided with a housing having a pair of opposite aligned, erect, substantially keyhole-shaped notches having their openings in the lower end rim of said pipe section, which allow the snapping on of said lower section onto the valve's tubular members serving as inlet and outlet ports therefor. At least the lower pipe section is of plastic having elastic quality, to effect said snapping on upon the downward movement of said lower section into the excavation to the said sunken valve; said telescopic sections constituting an erect pipe structure in which they are in frictional engagement with each other.

In the accompanying drawing forming part of this specification, similar characters of reference indicate corresponding parts in all the views.

Figure 1:
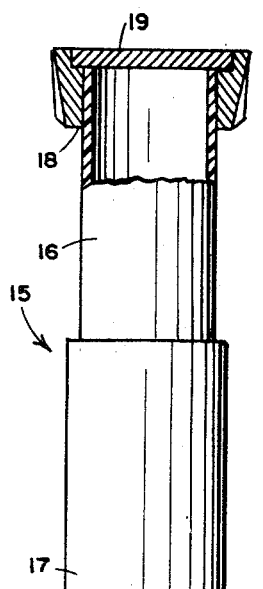
FIG. 1 is an elevational view of a valve service box embodying the teachings of this invention. This view is partly in section.
Figure 2:
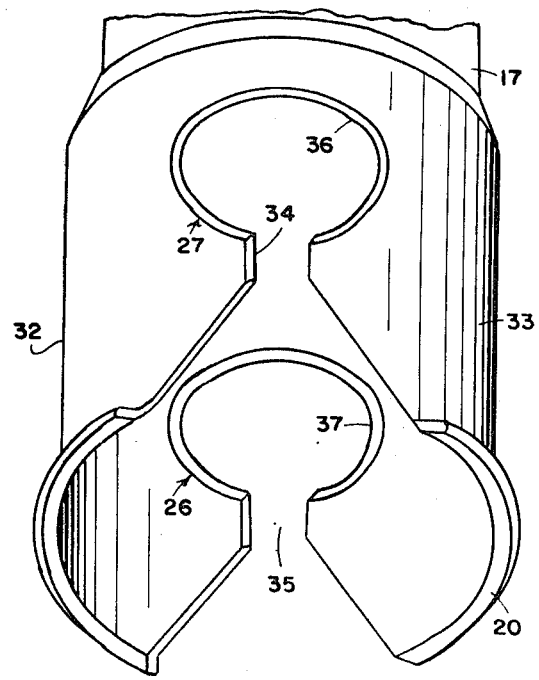
FIG. 2 is an enlarged, fragmentary perspective view of the lower portion of the telescopic pipe structure, showing the notch formations which are to receive and hold the tubular members which serve as the valve's inlet and discharge ports.
Figure 3:
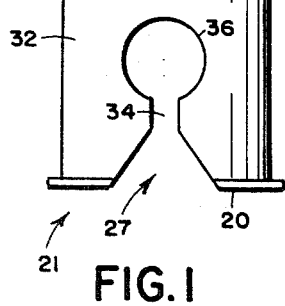
FIG. 3 is a fragmentary elevational view showing the service box installed encircling part of the sunken valve and snapped on the valve's tubular members which serve as its ports. This view is partly in section, and as to the service box, may be deemed a side view of FIG. 1.
Figure 3:
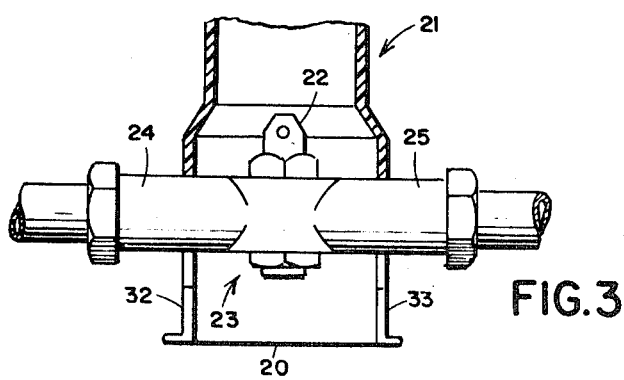
Figure 4:
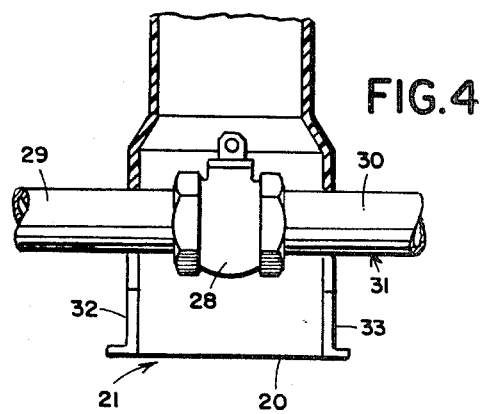
FIG. 4 is a view like FIG. 3, showing a modified valve type, encircled entirely by the lower telescopic member, which latter is snapped on separate tubular sections serving as the vlave's ports and may be the pipeline in which said valve is interposed.

In the drawing, the numeral 15 designates generally an erect pipe structure comprising the frictionally engaged, telescopically associated pipe sections denoted generally by the numerals 16 and 17 respectively. The upper tubular member 16 at its top end, terminates in an iron collar or ferrule 18, holding a closure plate 19. The lower tubular member 17, at its lower end, is usually a bit enlarged, and has opposite aligned notches whose openings are in the lower rim edge 20. Such is the general structure of the valve service box indicated generally by the numeral 21, which is to be installed in a trench or excavation and lead to sunken plumbing so that a cutoff valve interposed in a gas or water pipeline, shall have at least its operating member 22 encircled thereby. As is well known, the cover plate 19, is at ground level when the box is installed. The valve may be as shown at 23, wherein the valve housing has the aligned, oppositely extending tubular members 24 and 25, which serve as the intake and discharge ports therefor, and are entered into said notches respectively, which notches are denoted generally by the numerals 26 and 27, respectively. The valve may be as shown at 28, where it is entirely within the lower end of the lower pipe section 17; the connections 29 and 30 to said valve to interpose it in the supply line 31, being entered in said notches 26 and 27, respectively.

It is to be noted that each of the diametrically opposite identical notches 26 and 27, is of upright keyhole form whose entrance is flared, and that the lower pipe section 17 in which they exist, is of plastic having resilient quality. It is evident that in pushing the said section 17 downward onto the plumbing, to encase at least the valve's operating member 22, and admit the vlave's port-providing tubular members as 25, 26, or 29, 30 into the entrances of the respective notches 26 and 27, that soon the wings 32, 33 will be forced apart by further downward movement of said section 17, whereby said tubular members will pass the constricted passages 34, 35 respectively and enter into the pipe encirclements 36 and 37, by what may be called a snap-on action. The said lower pipe section 17 is maintained against detachment from the sunken plumbing and need not be tight fitting in 36 and 37. However it should be noted that the force required to pull the upper pipe section 16, upwardly out of the lower pipe section 17, shall be less than would be required to pull said lower section upwardly to free itself from the sunken plumbing. This allows all adjustments of the effective length of the telescopic structure 15, to be made by a worker on the ground at street level.

It is practical to make both sections 16 and 17 of plastic, as for instance polyethylene, or ABS as known in the trade.

This invention is capable of numerous forms and various applications without departing from the essential features herein disclosed. It is therefore desired and intended that the embodiments herein shall be deemed merely illustrative and not restrictive and that the patent shall cover all patentable novelty for which reference is had to the following claims rather than to the specific showings and description herein, to indicate the scope of this invention.

I claim:
1. A valve box comprising,
 a. at least one vertically elongated member having a generally axial passage open at the top and bottom,
 b. a hollow valve housing on the bottom of the elongated member, the housing being open at its bottom with the hollow interior thereof communicating with the passage in the elongated member,
 c. the housing having at least one opening in its side communicating with the bottom edge of the housing, the opening adapted to receive a pipe extending into said housing upon vertically downward movement of the housing, and
 d. means on the housing engageable with the pipe upon downward movement of the housing and after such engagement restraining separation of the housing and pipe upon upward movement of the housing.
2. A valve box comprising,
 a. the structure in accordance with claim 1 in which
 b. said means on the housing are defined by said opening.
3. A valve box comprising,
 a. the structure in accordance with claim 1 in which
 b. said means on the housing are a resiliently deflectable member extending into the opening.
4. A valve box comprising,
 a. the structure in accordance with claim 1 in which
 b. the said means on the housing are a constriction in the opening intermediate its top and bottom, the constriction being laterally resiliently deflectable.
5. A valve box comprising,
 a. the structure in accordance with claim 4 in which
 b. the said constriction is an integral part of the opening in the housing, the housing being sufficiently resilient to permit the constriction to resiliently deflect laterally.
6. A valve box comprising,
 a. the structure in accordance with claim 5 and
 b. an outwardly and downwardly flaring cam edge on the opening beneath the constriction.
7. A valve box comprising,
 a. the structure in accordance with claim 7 and
 b. an enlargement in the opening above the constriction to loosely receive the said pipe.